(12) United States Patent
Hagenbuch et al.

(10) Patent No.: US 11,718,028 B2
(45) Date of Patent: Aug. 8, 2023

(54) STEREOLITHOGRAPHY METHOD

(71) Applicant: Ivoclar Vivadent AG, Schaan (LI)

(72) Inventors: Konrad Hagenbuch, Haag (CH); Clemens Andreas Häfele, Feldkirch (AT); Roger Frei, Heerbrugg (CH)

(73) Assignee: Ivoclar Vivadent AG, Schaan (LI)

( * ) Notice: Subject to any disclaimer, the term of this patent is extended or adjusted under 35 U.S.C. 154(b) by 82 days.

(21) Appl. No.: 17/067,072

(22) Filed: Oct. 9, 2020

(65) Prior Publication Data
US 2021/0122112 A1 Apr. 29, 2021

(30) Foreign Application Priority Data
Oct. 23, 2019 (EP) .................................. 19204782

(51) Int. Cl.
| | | |
|---|---|---|
| *B29C 64/245* | (2017.01) | |
| *B33Y 10/00* | (2015.01) | |
| *B33Y 30/00* | (2015.01) | |
| *B29C 64/124* | (2017.01) | |
| *B33Y 70/10* | (2020.01) | |
| *B29K 105/16* | (2006.01) | |

(52) U.S. Cl.
CPC .......... *B29C 64/245* (2017.08); *B29C 64/124* (2017.08); *B33Y 10/00* (2014.12); *B33Y 30/00* (2014.12); *B33Y 70/10* (2020.01); *B29K 2105/16* (2013.01)

(58) Field of Classification Search
CPC ....... B29C 64/245; B29C 64/24; B29C 70/58; B29C 64/165; B33Y 10/00; B33Y 30/00; B33Y 70/10; B29K 2105/16; B29L 2031/7536; G03F 7/00; G03F 7/20
See application file for complete search history.

(56) References Cited

U.S. PATENT DOCUMENTS

| | | | | |
|---|---|---|---|---|
| 5,997,795 | A  * | 12/1999 | Danforth | .................... C30B 5/00 419/36 |
| 7,229,272 | B2 * | 6/2007 | Leuterer | ................ B33Y 10/00 425/375 |
| 7,481,647 | B2 * | 1/2009 | Sambu | ............... A61C 13/0013 425/436 R |
| 8,057,731 | B2 | 11/2011 | Abe | |
| 9,205,601 | B2 | 12/2015 | DeSimone et al. | |
| 9,849,632 | B2 * | 12/2017 | Hirata | ................... B29C 64/135 |
| 10,391,711 | B2 | 8/2019 | Sutter et al. | |
| 10,392,521 | B2 * | 8/2019 | Ng | ......................... B33Y 80/00 |
| 10,661,501 | B2 | 5/2020 | DeSimone et al. | |
| 10,710,305 | B2 | 7/2020 | DeSimone et al. | |
| 10,737,438 | B2 | 8/2020 | Ermoshkin et al. | |

(Continued)

FOREIGN PATENT DOCUMENTS

WO 2017192859 A3 7/2018

*Primary Examiner* — Nahida Sultana

(74) *Attorney, Agent, or Firm* — Ann M. Knab; Thad McMurray

(57) ABSTRACT

The present invention relates to a stereolithography method, comprising the steps of receiving a light-curing suspension (100) comprising filler particles (103) in a tray (105); adjusting the light-curing suspension by means of a build platform (107) to a layer thickness with respect to a bottom (109) of the tray (105) which is less than the diameter of the filler particles (103); and selectively curing the adjusted layer thickness of the suspension by means of light.

11 Claims, 4 Drawing Sheets

(56) References Cited

U.S. PATENT DOCUMENTS

| | | |
|---|---|---|
| 11,247,387 B2 * | 2/2022 | Barclay ................. B29C 64/371 |
| 2001/0036117 A1 | 11/2001 | Mullarkey |
| 2009/0020901 A1 * | 1/2009 | Schillen .................. B29C 70/88 |
| | | 425/149 |
| 2009/0130449 A1 | 5/2009 | El-Siblani |
| 2013/0323415 A1 * | 12/2013 | Brackley .............. B41M 5/0047 |
| | | 427/171 |
| 2014/0085620 A1 | 3/2014 | Lobovsky et al. |
| 2015/0071809 A1 | 3/2015 | Nordkvist et al. |
| 2016/0221262 A1 * | 8/2016 | Das .................... G03F 7/70416 |
| 2018/0200948 A1 | 7/2018 | Kuijpers et al. |
| 2018/0214984 A1 * | 8/2018 | Haro Gonzalez ....... B22F 10/20 |
| 2020/0307072 A1 | 10/2020 | Gacek et al. |
| 2021/0122104 A1 * | 4/2021 | Holt ...................... B29C 64/321 |

\* cited by examiner

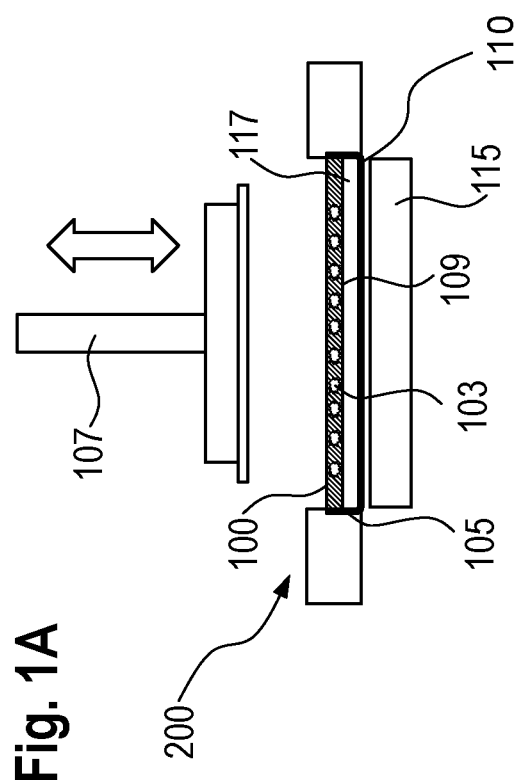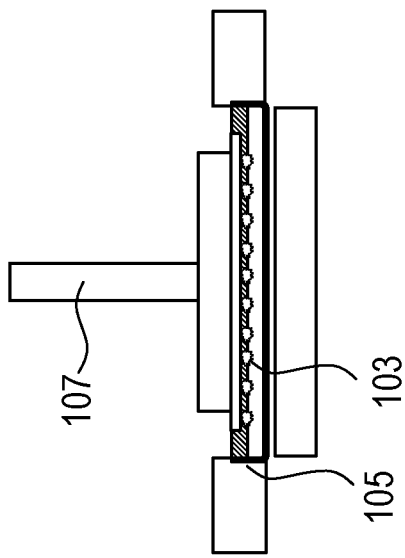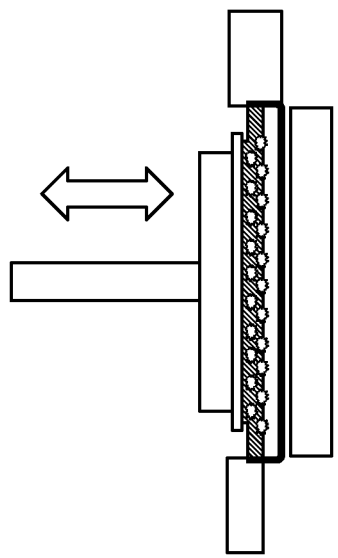

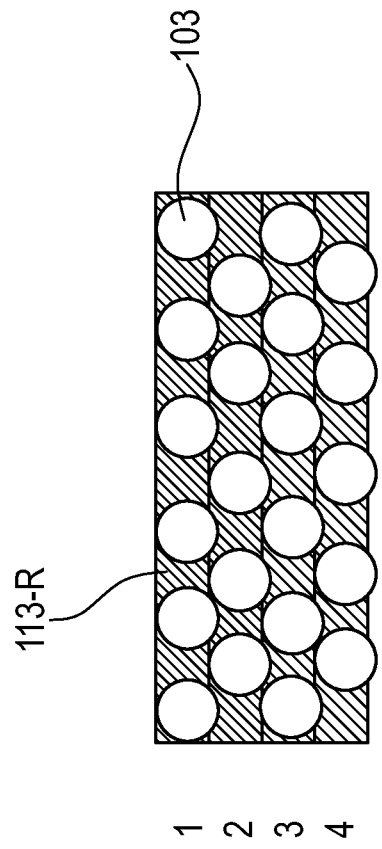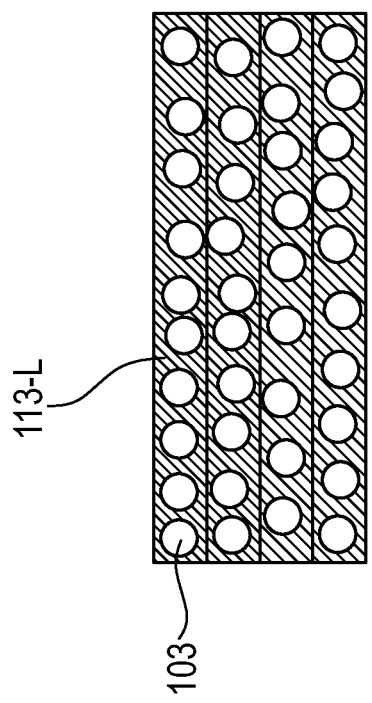

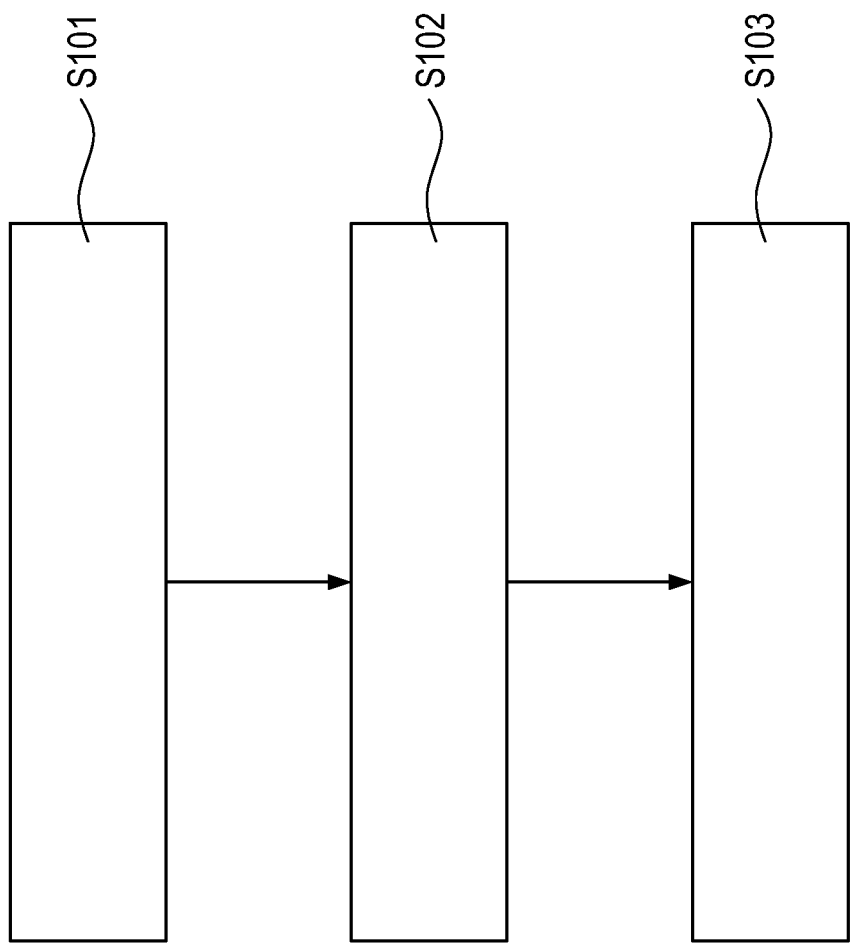

STEREOLITHOGRAPHY METHOD

CROSS-REFERENCE TO RELATED APPLICATIONS

This application claims priority to European patent application No. 19204782.7 filed on Oct. 23, 2019, the disclosure of which is incorporated herein by reference in its entirety.

FIELD OF THE INVENTION

The present invention relates to a stereolithography method for selectively curing a suspension which comprises filler particles and relates to a stereolithography apparatus for this method.

BACKGROUND

Techniques based upon stereolithography are limited by the layered structure of the material in physical properties. By reason of the maximum layer thickness defined in the process, it is normally not possible to process larger fillers. However, it is precisely these fillers which are able to fundamentally change the properties of the material systems used, such as e.g., in the field of composite materials. In the field of tooth materials, fillers can be used to increase e.g., the abrasion resistance. Filler particles have a positive influence in terms of rendering the materials suitable for polishing and in terms of the tendency of said materials to discolour.

A use of larger fillers can be accomplished theoretically by a corresponding increase in the layer thickness at the expense of accuracy. However, many stereolithography resins are not filled at all or contain particles in sizes less than 1 µm as thickeners, rheology additives or pigments. Current formulations for stereolithography dental materials do not have any fillers with a diameter larger than 1 µm. Therefore, the primary endeavour is that of avoiding the subject of sedimentation of particles in the resins.

Standard di(meth)acrylate-based stereolithography resins for producing prostheses generally do not contain any fillers. Occasionally, low proportions of pigments are used which, in principle, can also function as fillers. Upon exposure to light (DLP, SLA), the material is shaped and fixed by polymerisation, but the polymerisation is not performed in its entirety. This state is also referred to as a "green state".

The process is substantially terminated subsequently in so-called heat-treatment methods. These methods continue the polymerisation as far as possible by means of irradiation and/or heating. The material thereby achieves its final physical properties, such as e.g. modulus of elasticity, bending resistance, hardness and final geometry. The reaction produces changes in shape, such as e.g. shrinkage, or stresses in the material.

In principle, the use of fillers to reduce these effects is possible. However, fillers having small particles often result in significant thickening of the system, e.g., nano-fillers such as pyrogenic silica. However, fillers with larger particles which do not trigger this thickening to the same extent cannot be used in the construction process by reason of the fixed maximum layer thicknesses. Most stereolithography devices currently operate with minimum construction thicknesses of 20 µm, preferably 50 µm.

U.S. Pat. No. 10,392,521, 10,710,305, 10,737,438, 10,661,501, 10,391,711, 8,057,731, 9,205,601, US 20090130449, US 20010036117, U.S. Pat. No. 9,849,632, US 20180200948, US 20150071809, and PCT/US2017/031077 are directed to three-dimensional manufacturing operations and devices and are all hereby incorporated by reference in their entirety.

SUMMARY

The technical object of the invention is to improve the physical properties of a component which is produced by means of a suspension comprising filler particles.

According to a first aspect, this technical object is achieved by means of a stereolithography method, comprising the steps of receiving a light-curing suspension comprising filler particles in a tray; adjusting the light-curing suspension by means of a build platform to a layer thickness with respect to a bottom of the tray which is less than the diameter of the filler particles; and selectively curing the adjusted layer thickness of the suspension by means of light. In the case of the stereolithography method, it is possible to use fillers having a maximum diameter which exceeds the maximum planned construction height.

The stereolithography method provides the technical advantage that a structural change is affected in the internal structure of the workpiece away from the layered arrangement pattern of fillers to arbitrary distribution over the matrix layers (comprising polymerised resin) in the system. Therefore, anisotropic properties induced by the method are reduced and the produced component behaves isotropically. This is highly advantageous in particular in the case of tooth materials (similar to prefabricated teeth) but also in the case of composite materials.

In a technically advantageous embodiment of the stereolithography method, the layer thickness is less than the diameter of at least 5% of the filler particles. This provides e.g., the technical advantage that the properties of the produced component are further improved.

In a further technically advantageous embodiment of the stereolithography method, the constructed layer is separated from the bottom for the following layer. This provides e.g., the technical advantage that further layers can be constructed on this layer.

In a further technically advantageous embodiment of the stereolithography method, the filler particles intrude into the flexible bottom of the tray during the adjustment of the first and/or a further layer thickness. This provides e.g., the technical advantage that a compact structure of the produced component is achieved.

In a further technically advantageous embodiment of the stereolithography method, a mechanical stress of a sheet which covers the bottom of the tray is determined by means of a force measurement. This provides e.g., the technical advantage that the sheet can be prevented from tearing.

In a further technically advantageous embodiment of the stereolithography method, the filler particles are received in recesses in a pressure surface of the build platform during the first adjustment of the layer thickness. The recesses can be formed in a detachable replacement part of the build platform.

The recesses can be arranged in a hexagonal pattern or other symmetrical geometry. This provides e.g. the technical advantage that the arrangement of the filler particles can be specified.

In a further technically advantageous embodiment of the stereolithography method, the filler particles are received in recesses in the bottom of the tray or in a reference plane during adjustment of the layer thickness. The recesses can be formed in a detachable replacement part of the tray or the reference plane. The recesses can be arranged in a hexagonal pattern or other symmetrical geometry. This provides e.g., the technical advantage that the arrangement of the filler particles can be specified.

The recesses may be the size of the filler particles, by which the filler particles insert into the recesses and align with the pattern contained in the tray or pressure surface. A pattern of the filler particles is thereby produced in each layer.

In a further technically advantageous embodiment of the stereolithography method, the tray and/or the build platform is moved along the layer after the curing procedure, in order to arrange the filler particles in an offset manner in the next layer. The alternating offsetting in the lateral direction of the build platform or the tray provides e.g., the technical advantage that the filler particles can be arranged in an offset manner from layer to layer and a homogeneous structure is achieved.

According to a second aspect, this technical object is achieved by means of a stereolithography apparatus for performing the method according to the first aspect. The stereolithography apparatus provides the same technical advantages as the stereolithography method.

In a technically advantageous embodiment of the stereolithography apparatus, the stereolithography apparatus comprises a tray having a bottom which is formed from a material which the filler particles can intrude into. This provides e.g., the technical advantage that a compact structure of the produced component is achieved.

In a further technically advantageous embodiment of the stereolithography apparatus, the material comprises a transparent elastic sheet or a silicone layer. This provides e.g., the technical advantage that particularly suitable materials are used which allow the filler particles to intrude into.

In a further technically advantageous embodiment of the stereolithography apparatus, the build platform, the bottom of the tray or the reference plane comprises recesses for receiving the filler particles. This provides e.g., the technical advantage that the filler particles can be arranged at specified positions.

In a further technically advantageous embodiment of the stereolithography apparatus, the bottom of the tray can be replaced. This provides e.g., the technical advantage that the bottom can be adapted to the filler particles.

BRIEF DESCRIPTION OF THE DRAWINGS

Exemplified embodiments of the invention are illustrated in the drawings and are described in more detail hereinunder.

In the figures:

FIGS. 1A to 1D show a schematic structure of a stereolithography apparatus;

FIGS. 2A and 2B show a cross-sectional view of differently produced workpieces;

FIG. 4 shows a block diagram of a stereolithography method.

DETAILED DESCRIPTION

Figure 3A:
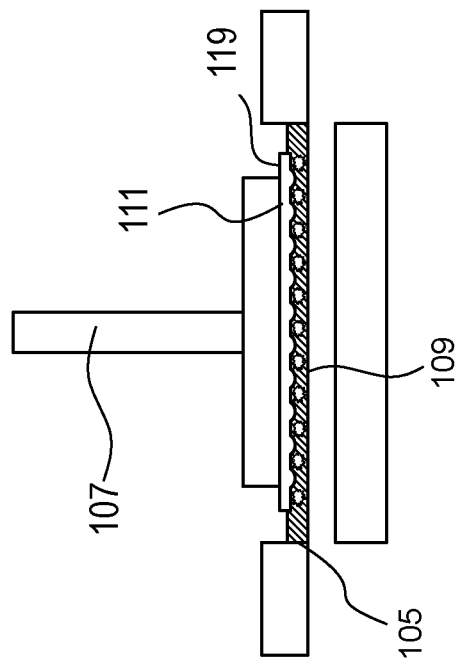
FIGS. 3A and 3B show a schematic structure of a further stereolithography apparatus.

FIGS. 1A-1D show a schematic structure of a stereolithography apparatus 200. The stereolithography apparatus 200 serves to produce a workpiece or component 113 in layers. For this purpose, a photopolymer or a monomer mixture of a suspension 100 is cured in layers by means of light. In addition to the photopolymer, the suspension 100 comprises filler particles 103. The filler particles 103 are embedded in the polymer matrix after curing. The filler particles 103 serve to increase the strength and abrasion resistance. Moreover, the filler particles 103 can improve the ability of the workpiece 113 to be polished or reduce a tendency to become discoloured.

The filler particles 103 are present e.g., having an average diameter of 30 µm to 80 µm. Diameters can be higher or lower than this range such as, 1 µm to 1000 µm, 10 µm-500 µm, 20 µm-200 µm, 30 µm-100 µm, 40 µm-90 µm, but it is preferable that the thickness of each layer be smaller than a certain amount of particle diameters. These fillers can be formed by, but not limited to e.g., metal oxide particles, such as aluminium oxide particles, silica particles, ceramic particles, particles consisting of cross-linked polymers, composite particles, glass particles, duromer particles or polymer particles.

In FIG. 1A, the light-curing suspension 100 (resin) comprising the filler particles 103 is located in a tray 105 of the stereolithography apparatus 200. The build platform 107 is in a retracted state. The filler particles 103 are distributed randomly in the suspension 100.

The tray 105 has a transparent bottom 109 and so the suspension 100 can be irradiated with light through the bottom 109 of the tray 105, in order to cure the polymer. For this purpose, a light exposure controller 115 which can generate different light patterns is located underneath the bottom 109. By means of the light exposure controller 115, the polymer can be cured selectively in layers in a desired contour and area. As a result, each individual layer can be formed in any specifiable area.

In FIG. 1B, the construction process is initiated. The desired layer thickness for forming the first layer is approached by the build platform 107. The layer is formed between the bottom 109 of the tray 105 and the planar underside of the build platform 107. The minimum layer thickness is less than the diameter of the filler particles 103. The filler particles 103 intrude into the bottom 109 of the tray 105 completely or partially.

For this purpose, the tray 105 can have an elastic sheet 117 which is deformed by the filler particles 103. Then, the light exposure controller 115 exposes the adjusted layer thickness to selective light exposure, such as e.g., by means of a light pattern, and so said layer thickness cures at the illuminated locations. The pressure exerted upon the filler particles 103 by the build platform 107 causes said filler particles to intrude into the bottom 109 of the tray 105. This state is fixed by the light exposure controller 115.

The bottom 109 of the tray 105 can be replaceable. The bottom 109 can also have an elastic sheet 117 which covers the bottom 109 of the tray 105 and into which the filler particles 103 are pressed. The mechanical stress of the sheet 117 can be determined by means of a force measuring apparatus. In this case, the build platform 107 can be moved as long as the mechanical stress of the sheet 117 does not exceed a specified value. Moreover, the sheet 117 can be prevented from tearing.

The bottom 109 of the tray 105 can rest on a glass plate which forms a separate reference plane. The glass bottom supports the bottom 109 of the tray 105 from below. If a sheet 117 or a tray 105 having a silicone layer is used, the glass plate can prevent the suspension 100 from running out in the event of the sheet 117 or the silicone layer tearing.

In FIG. 1C, the build platform 107 is retracted once again. For the following layer, the built layer is separated from the bottom 109. The filler particles 103 protrude from the plane of the polymerised resin matrix, which is located on the build platform 107, and form a rough surface structure. The level of the suspension 100 equalizes in the tray 105. Then, the stereolithography apparatus 200 is operative for building the next layer. In the stereolithography process, the build platform 107 is not completely removed from the tray 105. The content of the tray 105 normally is several mm in height so that, after the build platform 107 has been raised slightly, the suspension 100 subsequently flows back.

In FIG. 1D, the building process is continued in that the desired layer thickness is approached by the build platform 107. In this case, the layer thickness is adjusted between the already cured layer and the bottom 109 of the tray 105. As a result, the filler particles 103 of the new layer intrude into the bottom 109 of the tray 105. Since the filler particles 103 of the new layer evade the elevations of the filler particles 103 of the already cured layer, a layered offset arrangement of the filler particles 103 is produced.

Then, further exposure to light is affected so that this layer also cures. The filler particles 103 of the new layer fill the gaps between the filler particles 103 of the previous layer. This process of building layers is repeated for as long as the desired build height of the workpiece 113 is achieved.

The workpieces 113 which can be produced by the stereolithography method have an inner filler distribution which is like that of bulk processes, such as e.g. in the case of injection-moulding or in the case of milled bodies from blanks. The abrasion resistance and other physical properties are approximate to the ideal state because parallel, filler-free matrix layers are no longer present. The orientation during the build also plays only a secondary role. The individual layers are in parallel and can also include only a few filler particles 103 which protrude into the next layer.

The additively produced workpiece 113 can be adjusted with the layer-overlapping fillers to completely new physical properties.

In the case of dental materials, such as e.g. tooth material or composite materials, it is possible to produce materials, the properties of which are considerably closer to conventionally produced tooth, prosthesis or composite materials. By using fillers, it is possible to optimise gloss stability, abrasion resistance or physical properties, such as bending resistance or impact strength. Moreover, (hard) rubber types which can be deformed poorly or to a small extent can be used for a prosthesis base material for modifying impact strength.

FIGS. 2A and 2B show a cross-sectional views of differently produced workpieces 113-L and 113-R with the layers 1 to 4. The left workpiece 113-L has been produced by a conventional stereolithography method. In this workpiece 113-L, the filler particles 103 are arranged in parallel layers which are separated by filler-free intermediate layers. The concentration of the filler particles 103 on the layers produces a non-uniform structure of the workpiece 113-L.

In contrast, the right workpiece 113-R has been produced by the novel stereolithography method. In this workpiece 113-R, the filler particles 103 are distributed uniformly and in a structured manner over the entire volume, without said filler particles being separated by filler-free intermediate layers. This is achieved by virtue of the fact that they are partially pressed out of their original layer during curing. Then, when the next layer is being built, they protrude partially therein. Although the filler particles 103 are illustrated as being uniformly large, they can have a size distribution.

Figure 3B:
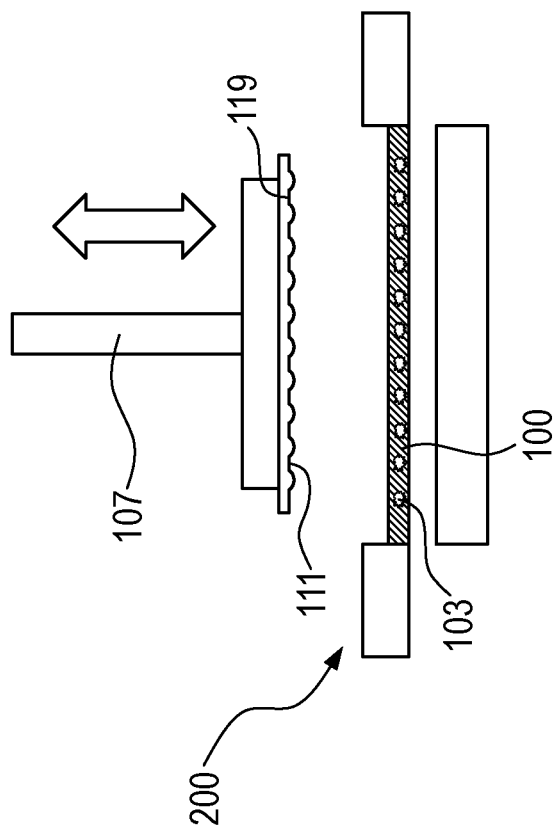

FIGS. 3A and 3B show a schematic structure of a further stereolithography apparatus 200. In this stereolithography apparatus 200, the build platform 107 comprises, on its pressure surface 119, recesses 111, in which the filler particles 103 can be partially received during the first adjustment of the layer thickness. The build platform 107 can also comprise elevations which the filler particles 103 must evade during adjustment of the layer thickness.

The structured build platform 107 moves to the correctly spaced interval for forming the first layer. The filler particles 103 evade the structured area on the build platform 107 and form an arrangement pattern for the first layer. Then, the filler particles 103 may or may not sink into the bottom 109 of the tray 105.

Figure 3C:
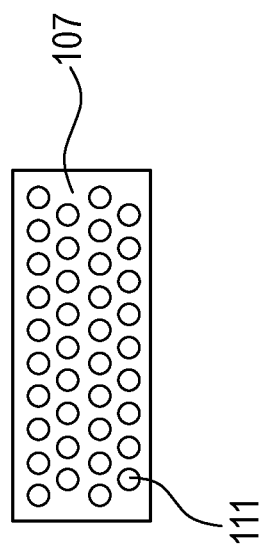
FIG. 3C shows a top view of a structured build platform.

FIG. 3C shows a top view of a structured build platform 107. The recesses or elevations 111 are formed in the pressure surface 119 of the build platform 107. The recesses or elevations 111 can be arranged in the build platform 107 in a hexagonal pattern or other symmetrical geometry. As a result, the filler particles 103 can be arranged at desired locations.

The functionality of the stereolithography method depends upon the filler distribution in the first produced layer because the positions of the filler particles 103 specify the respective positions in the next layer. The filler is distributed in the first built layer arbitrarily by virtue of physical processes which are difficult to predict, such as e.g. by reason of rheology.

The structured build platform 107 serves to provide, for the first layer, a specification relating to the spatial distribution of the excessively sized filler particles. This prevents the particles in the first layer from being arranged arbitrarily and prevents this pattern from continuing in the following layers by evasion into the gaps in each case.

The structured build platform 107 specifies a clear structure in order to be able to adjust the desired material property of the workpiece. For this purpose, it is feasible to provide an adapter or an attachment part for the structured build platform 107 with differently arranged recesses or elevations 111, which specifies the structure for the different filling body dimensions.

However, the elevations or recesses 111 for positioning the filler particles 103 can also be formed in the bottom 109 of the tray 105 or in a reference plane.

FIG. 4 shows a block diagram of a stereolithography method. In the first step S101, a light-curing suspension 100 comprising filler particles 103 is received in the tray 105. Then, in step S102, the light-curing suspension is adjusted by means of a build platform 107 to a layer thickness with respect to a bottom 109 of the tray 105 which is less than the diameter of the filler particles 103. In step S103, the adjusted layer thickness of the suspension is cured by means of light. Then, the build platform 107 is raised so that the cured layer is separated from the bottom of the tray 105 and steps S102 and 103 are repeated.

While the steps are being repeated, the tray 105 and/or the build platform 107 can be moved along the layer in an alternating manner laterally, i.e. to the left or right, with respect to the tray 105 after the curing procedure, in order to arrange the filler particles 103 in an offset manner in the next layer. This improves homogeneity of the structure of the workpiece 113.

Instead of the build platform 107, the tray 107 can also be moved in an alternating manner in a lateral direction with respect to the build platform 107. As a result, a homogeneous structure of the workpiece 113 can likewise be achieved.

All features explained and illustrated in conjunction with individual embodiments of the invention can be provided in different combinations in the subject matter in accordance with the invention in order to achieve the advantageous effects thereof at the same time.

All the method steps can be implemented by apparatuses which are suitable for carrying out the respective method step. All functions which are carried out by features relating to an apparatus can be a method step of a method.

The scope of protection of the present invention is set by the claims and is not limited by the features explained in the description or shown in the figures.

In some embodiments, the stereolithography system may include suitable devices including, but not limited to, an energy source, a central processing unit (CPU) or controller to execute (machine-readable) instructions to cause the devices to perform the aforementioned processes. Machine-readable instructions can be stored on a non-transitory, tangible machine-readable storage medium, which may manipulate and transform data represented as physical (electronic) quantities with the memories of the device in order to control the physical elements to create the 3D object.

In some embodiments, an energy source used in the process or system may be any source that may emit energy such as, but not limited to, IR, near-IR, UV, or visible curing lamps, IR, near-IR, UV, or visible light emitting diodes (LED), or lasers with specific wavelengths.

LIST OF REFERENCE SIGNS 100 suspension
103 filler particles
105 tray
107 build platform
109 bottom
111 recess
113 workpiece
115 light exposure controller
117 sheet
119 pressure surface
200 stereolithography apparatus

The invention claimed is:

1. Stereolithography method, comprising the steps of:
receiving a light-curing suspension comprising filler particles, in a tray;
adjusting the light-curing suspension by a build platform to a layer thickness with respect to a bottom of the tray which layer thickness is less than a diameter of the filler particles, wherein the bottom of the tray is flexible and the filler particles intrude into the flexible bottom of the tray during adjustment of a first and/or further layer thickness; and
selectively curing the adjusted layer thickness of the suspension by means of light.

2. Stereolithography method as claimed in claim 1, wherein the layer thickness is less than the diameter of at least 5% of the filler particles.

3. Stereolithography method as claimed in claim 1, wherein the built layer is separated from the bottom for the following layer.

4. Stereolithography method as claimed in claim 1, wherein a mechanical stress of a sheet which covers the bottom of the tray is determined by means of a force measurement.

5. Stereolithography method as claimed in claim 1, wherein the filler particles are received in recesses in a pressure surface of the build platform during the first adjustment of the layer thickness.

6. Stereolithography method as claimed in claim 1, wherein the filler particles are received in recesses in the bottom of the tray or in a reference plane during adjustment of the layer thickness.

7. Stereolithography method as claimed in claim 1, wherein the tray and/or the build platform is moved along the layer after the curing procedure, in order to arrange the filler particles in an offset manner in the next layer.

8. Stereolithography apparatus for performing a method comprising
receiving a light-curing suspension comprising filler particles, in a tray, wherein the tray comprises a bottom which is formed from a material which the filler particles can intrude into;
adjusting the light-curing suspension by a build platform to a layer thickness with respect to a bottom of the tray which layer thickness is less than a diameter of the filler particles; and
selectively curing the adjusted layer thickness of the suspension by light.

9. Stereolithography apparatus as claimed in claim 8, wherein the material comprises a transparent elastic sheet or a silicone layer.

10. Stereolithography apparatus as claimed in claim 8, wherein the build platform, the bottom of the tray or the reference plane comprises recesses for receiving the filler particles.

11. Stereolithography apparatus as claimed in claim 10, wherein the bottom of the tray is replaceable.

* * * * *